United States Patent
Haupt et al.

(10) Patent No.: US 10,920,858 B2
(45) Date of Patent: Feb. 16, 2021

(54) SHIFTABLE TWO-SPEED TRANSMISSION SUITABLE FOR EDRIVE

(71) Applicant: GKN Automotive Ltd., Redditch (GB)

(72) Inventors: Jan Haupt, Kürten (DE); Moritz Abbenhaus, Troisdorf (DE); Maximilian Werkhausen, Cologne (DE)

(73) Assignee: GKN Automotive Ltd., Redditch (GB)

( * ) Notice: Subject to any disclaimer, the term of this patent is extended or adjusted under 35 U.S.C. 154(b) by 0 days.

(21) Appl. No.: 16/462,429

(22) PCT Filed: Nov. 29, 2016

(86) PCT No.: PCT/EP2016/079169
§ 371 (c)(1),
(2) Date: May 20, 2019

(87) PCT Pub. No.: WO2018/099542
PCT Pub. Date: Jun. 7, 2018

(65) Prior Publication Data
US 2019/0360557 A1    Nov. 28, 2019

(51) Int. Cl.
*F16H 3/56*     (2006.01)
*B60K 17/08*    (2006.01)
(Continued)

(52) U.S. Cl.
CPC .............. *F16H 3/56* (2013.01); *B60K 17/02* (2013.01); *B60K 17/046* (2013.01); *B60K 17/08* (2013.01);
(Continued)

(58) Field of Classification Search
CPC ...... B60K 17/00; B60K 17/02; B60K 17/046; B60K 17/08; B60K 17/16; B60K 17/20;
(Continued)

(56) References Cited

U.S. PATENT DOCUMENTS

| 2011/0027105 A1* | 2/2011 | Haupt ................. F16H 61/0025 417/53 |
| 2014/0256493 A1* | 9/2014 | Knoblauch .......... B60K 7/0007 475/151 |

(Continued)

FOREIGN PATENT DOCUMENTS

| DE | 10 2012 220562 A1 | 5/2014 |
| DE | 10 2015 104203 A1 | 9/2016 |

(Continued)

OTHER PUBLICATIONS

International Search Report and Written Opinion for PCT/EP2016/079169 dated Apr. 10, 2017 (23 pages; with English translation).
Japanese Office Action for Application No. JP2019-548517 dated Jul. 27, 2020 (12 pages; with English translation).

*Primary Examiner* — David R Morris
(74) *Attorney, Agent, or Firm* — Bejin Bieneman PLC

(57) ABSTRACT

In a power-shift two-speed transmission for transmitting propulsion power, in particular propulsion power from an electric motor, within a motor vehicle drivetrain, possibly driven by electric motor, of a passenger car, by means of which a direct drive and a transmission stage with a transmission ratio that differs from the direct drive can be implemented and which has the three assembly units comprising an outer gear unit, a planet gear unit and a sun unit, it is provided for the propulsion power to be introduced into the transmission via the outer gear unit when propulsion power is being transmitted.

15 Claims, 3 Drawing Sheets

(51) Int. Cl.
*B60K 17/02* (2006.01)
*B60K 17/04* (2006.01)
*B60K 17/16* (2006.01)
*F16H 3/54* (2006.01)

(52) U.S. Cl.
CPC ............... *B60K 17/16* (2013.01); *F16H 3/54* (2013.01); *F16H 2200/0034* (2013.01); *F16H 2200/2005* (2013.01); *F16H 2200/2066* (2013.01); *F16H 2200/2082* (2013.01)

(58) Field of Classification Search
CPC ............... B60K 1/00; B60K 2001/001; F16H 2200/0034; F16H 2200/2005; F16H 2200/2035; F16H 2200/2066; F16H 2200/2033; F16H 2200/2082; F16H 3/44; F16H 3/56; F16H 3/54
See application file for complete search history.

(56) References Cited

U.S. PATENT DOCUMENTS

2015/0224867 A1* 8/2015 Nett .................... B60K 6/52
                                                180/65.25
2016/0146322 A1  5/2016 Knoblauch

FOREIGN PATENT DOCUMENTS

| EP | 2016/079169 A2 | 4/2017 |
| FR | 3014986 A1 | 6/2015 |
| JP | S45-29687 | 11/1970 |
| JP | S5457101 U | 4/1979 |
| JP | S59-125420 U | 8/1984 |
| JP | S61-39630 U | 3/1986 |
| JP | 2002-104001 A | 4/2002 |
| JP | 2016097967 A | 5/2016 |

\* cited by examiner

SHIFTABLE TWO-SPEED TRANSMISSION SUITABLE FOR EDRIVE

CROSS-REFERENCE TO RELATED APPLICATIONS

This application is a national stage of, and claims priority to, Patent Cooperation Treaty Application No. PCT/EP2016/079169, filed on Nov. 29, 2016, which application is hereby incorporated herein by reference in its entirety.

BACKGROUND

The transmission of driving power from an electric motor and/or an internal combustion engine via a two-speed transmission arranged in a hybrid drivetrain, which can also be driven purely by electric motor, is disclosed in WO 2010/063735 A1. The drivetrain concept described in this disclosure is a hybrid drivetrain which must ensure the transmission both of driving power from an internal combustion engine and driving power from an electric motor or a combination of both types of driving power. Accordingly, the two-speed transmission must have both input members for introducing the driving power from the internal combustion engine and input members for introducing the driving power from the electric motor, must allow the combination thereof, and must make available transmission stages which meet both the requirements of the internal combustion engine and those of the electric motor. This two-speed transmission is therefore not readily incorporated into a drivetrain exclusively for an electric motor. The concept disclosed in WO 2010/063735 A1 furthermore does not allow the implementation of certain transmission ratios that may be regarded as advantageous for vehicles driven purely by electric motor and is not very compact in construction, not least because of the need to brake the annulus relative to a stationary housing in order to change the transmission stage and the need to feed the driving power to the wheel shafts via a three-shaft offset.

SUMMARY

The present disclosure relates to a shiftable, in particular to a power-shift, two-speed transmission for transmitting propulsion power, in particular propulsion power from an electric motor, within a motor vehicle drivetrain, preferably driven by electric motor, of a passenger car, comprising a rotationally driven transmission input member, via which, when propulsion power is being transmitted, the propulsion power is introduced into the transmission, and a rotationally driven transmission output member, via which the propulsion power is transmitted out of the transmission, wherein, subject to the shift position of a shiftable clutch, a direct drive (i=1, second gear) or a transmission stage having a transmission ratio which differs from the direct drive (i≠1, preferably i>1, first gear) can be implemented between the input member and the output member, and wherein at least the three assembly units comprising an outer gear unit, a planet gear unit and a sun unit, are provided. A final drive unit having a two-speed transmission of this kind is also included in this disclosure.

Accordingly, provided is a two-speed transmission, e.g., a two-speed power-shift transmission, of the type stated above which has a compact construction and can be integrated with as small a requirement as possible for installation space into a final drive unit, e.g., a drive unit that can be driven purely by electric motor. At the same time, it should be possible, by means of the two-speed transmission, to implement a change in transmission ratio which is well-suited to a drivetrain, particularly one which is driven purely by electric motor, can also be performed under load, and allows advantageous harmonization of the required limitation of the starting torque of the electric machine when driving away from the stationary condition and the achievable maximum speed.

Advantages are achieve because, when propulsion power is being transmitted, the propulsion power is introduced into the transmission via the outer gear unit. The outer gear unit thus forms the rotationally driven input member of the transmission.

In particular, it is possible here to provide for the outer gear unit to have an outer gear, and for the planet gears of the planet gear unit to be at least partially or even completely integrated into the outer gear, being situated radially on the inside. In particular, the outer gear unit can have an outer gear having outer teeth, via which the propulsion power is introduced into the outer gear unit. The outer teeth can be provided on at least part of the output-facing lateral surface of the outer gear, wherein this part of the lateral surface of the outer gear which is provided with the outer teeth can be arranged around at least some of the planet gears of the planet gear unit, when viewed radially. Accordingly, the planet gears of the planet gear unit can be arranged at least partially radially within that part of the lateral surface of the outer gear which is provided with the outer teeth, and therefore enter at least partially or even completely into the imaginary cylinder defined by that part of the lateral surface which is provided with the outer teeth.

A compact construction is achieved by a design of this kind. The design makes it possible to provide the gearwheel pair forming the transmission stage (i≠1) (planet gears of the planet gear unit and sun gear) radially within the input member (the rotationally driven component of the transmission, into which the propulsion power is introduced), or with only a slight or no axial offset relative to the input member, with the result that the transmission is of flat and compact construction overall, especially in the axial direction, and takes up little axial installation space.

By closing the clutch, the assembly units can be locked relative to one another in such a way that all three assembly units revolve as a block and a direct drive (i=1) via the transmission is ensured. By opening the clutch, the power-transmitting and rotationally driven assembly unit acting as the transmission output member can then be in engagement via the teeth forming the transmission stage with the other assembly unit or units and can enable the transmission ratio of the transmission stage (i≠1).

The sun unit can be a supporting sun unit and can have at least one supporting sun gear. A supporting sun unit having a supporting sun gear should be taken to mean a sun unit, the sun gear of which is not driven in rotation, i.e., does not rotate in a power-transmitting manner but is blocked in a torque-supporting manner, i.e., is stationary, when the transmission is operated in transmission stage (i≠1). In order to enable the torque-supporting stationary condition of the supporting sun gear, a blocking device is provided, by means of which a supporting sun gear of the sun unit designed as a supporting sun unit is blocked in at least one direction of rotation in order to implement the transmission stage. In this case, the planet gear unit rotates in a power-transmitting manner and acts as a rotationally driven transmission output member.

As an alternative, the sun unit can be designed as an output sun unit and can have an output sun gear which rotates in a power-transmitting manner when the transmission is operating in the transmission stage ($i \neq 1$) and is acting as a rotationally driven transmission output member. In this case, the planet gear unit would be stationary in a torque-supporting manner and would be blocked in a torque-supporting manner in at least one direction of rotation by means of a blocking device in order to implement the transmission stage.

The blocking device can be designed as a passive blocking device. A blocking device should be taken to be "passive" if it does not require a shifting element which needs an external supply of energy or some other external actuating means to produce the desired shift state, i.e., that of blocking either the supporting sun gear or the planet gear unit in one direction of rotation to enable said gear or unit to act in a torque-supporting manner, but ensures blocking in one direction of rotation by itself. A blocking device of this kind can be formed, in particular, by a freewheel which blocks the assembly unit with which the freewheel interacts (the supporting sun unit or the planet gear unit, depending on the embodiment of the transmission) in one direction of rotation and allows it to rotate to a large extent freely in the other direction of rotation.

However, it is also possible to provide an active blocking device which performs blocking either of the supporting sun gear or of the planet gear unit in at least one direction of rotation only by virtue of an externally initiated actuation or activation by means of an external supply of energy. The advantage of an active controllable blocking device of this kind is that it also enables an energy recovery mode and reversing while the transmission stage is engaged because the otherwise free rotation of the assembly unit, which is stationary and has a torque-supporting effect in the case of propulsion, can also be prevented.

The transmission ratio of the transmission stage (speed of the transmission output member in relation to the speed of the transmission input member) can be greater than 1. A transmission ratio around 2, in particular a transmission ratio of $1.7 < i < 2$, is regarded as particularly suitable.

The shiftable clutch by means of which the assembly units are locked to one another to produce the direct drive ($i=1$) can in principle act between any two assembly units, i.e., both between the outer gear unit and the supporting or output sun unit, the outer gear unit and the planet gear unit or between the planet gear unit and the supporting or output sun unit. Depending on the embodiment of the transmission, however, a particular arrangement of the clutch may be regarded as advantageous. Provision can be made for the clutch to act between the outer gear unit and the supporting or output sun unit.

It is also possible that the outer gear of the outer gear unit is an annulus provided with internal teeth, by means of which the planet gears of the planet gear unit are in mesh, wherein the planet gears of the planet gear unit are, in turn, in mesh with the sun gear of the sun unit. Here, the transmission ratio when the transmission is operating in the transmission stage can be implemented by either blocking the sun gear or the planet gear unit in a torque-supporting manner by means of the blocking device, while the other assembly unit in each case rotates in a power-transmitting manner as a transmission output member.

However, use can be made of an embodiment of the transmission in which the outer gear unit is not in engagement with planet gears of the planet gear unit via teeth, that is to say, in particular, does not have internal teeth pointing toward the planet gears of the planet gear unit and in engagement with the latter. To implement a power-transmitting transmission ratio within the two-speed transmission, an additional stage step change must then be provided.

In such a case, use can be made of a two-speed transmission in which the planet gear unit has at least one planet gear pair having at least one first planet gear having a first effective planet gear diameter and at least one second planet gear connected for conjoint rotation to the first planet gear and having a second effective planet gear diameter, wherein, in addition to a supporting sun unit having a supporting sun gear having an effective supporting sun gear diameter, an output sun unit having an output sun gear having an effective output sun gear diameter is provided, wherein the first planet gear meshes with the supporting sun gear, and the second planet gear meshes with the output sun gear.

In this case, the supporting sun gear and the output sun gear are rotatably mounted independently of one another and the output sun gear acts as a rotationally driven transmission output member independently of whether the assembly units revolve as a block owing to closure of the clutch (direct drive) or whether the supporting sun gear is blocked by the blocking device and is stationary with a torque-supporting effect (transmission stage). Even if the supporting sun gear is blocked in at least one direction of rotation by means of a blocking device, the propulsion power is accordingly transmitted out of the transmission via the output sun gear as part of the transmission output member.

In a design of this kind, provision is furthermore made for the outer gear unit and the planet gear unit to be connected permanently to one another for conjoint rotation and, as a coherent functional unit, jointly to form the rotationally driven transmission input member. The planet gear pairs rotate together with the outer gear unit around the supporting sun unit and the output sun unit and, in the process, roll on the two sun units when the transmission is being operated in the transmission stage. Such a construction makes it possible to implement the transmission stages regarded as particularly suitable while simultaneously obtaining a compact construction of the transmission assembly. In this way, an advantageous axial possibility of integration of the clutch ensuring the direct drive into the transmission assembly is created.

It is regarded as particularly advantageous if the clutch ensuring the direct drive acts between the outer gear unit and the supporting sun unit or between the outer gear unit and the output sun unit.

A final drive unit, in particular for an electric-motor drivetrain of a motor vehicle, into which a two-speed transmission as described above is integrated, is likewise possible. Provision can be made for the final drive unit to have a differential unit for driving wheel shafts, and for the two-speed transmission and the differential unit to be accommodated in a common final drive housing.

In an advantageous example, provision can be made for a transmission drive shaft driven by electric motor to be in direct power-transmitting (gearwheel) engagement with the outer gear unit in order to introduce the driving power of the electric motor or, in a different example, the engine power of an internal combustion engine or, in the case of a hybrid drivetrain, also the combined driving power of the electric motor and the internal combustion engine, into the two-speed transmission. The transmission drive shaft, driven by the electric motor and/or the internal combustion engine, via which the power of the electric motor and/or of the internal combustion engine is introduced into the transmission, can have teeth which are in engagement with outer teeth provided on at least part of the lateral surface of the outer gear of the outer gear unit in order to introduce the driving power directly into the outer gear forming part of the transmission input member, in particular into the outer lateral surface of said gear.

To ensure that the final drive unit is of compact construction overall, provision can be made for the transmission drive shaft to be arranged coaxially with a wheel shaft. In particular, the transmission drive shaft can be a hollow shaft, within which one wheel shaft rotates as an inner shaft.

For driving the wheel shafts and hence the driven vehicle wheels, the final drive unit can have a differential unit having a rotationally driven differential housing. In this case, provision can be made for the output member of the transmission or a transmission output shaft driven by the output member of the transmission to be in direct power-transmitting engagement with the differential housing of the differential unit via a driving gearwheel arranged for conjoint rotation thereon or formed integrally thereon.

In this case, the differential unit can be either a conventional differential having a differential transmission acting by positive engagement or a clutch-controlled differential, in which the driving power is transmitted to the wheel shafts from the differential housing via frictionally acting and preferably individually controllable differential clutches. In this case, the final drive unit can have a clutch-controlled differential unit having at least one differential clutch for driving wheel shafts, wherein the differential unit has a differential housing and the differential housing is designed as a plate carrier of the at least one differential clutch. In this case, the differential housing preferably forms an outer plate carrier of the differential clutches, which are designed as a multiplate clutches. The wheel shaft drive members are then connected for conjoint rotation to an inner plate carrier or form said carrier.

In summary, therefore, in a power-shift two-speed transmission for transmitting propulsion power from an electric motor and/or an internal combustion engine, within a motor vehicle drivetrain driven by electric motor and/or an internal combustion engine, of a passenger car, by means of which a direct drive and a transmission stage with a transmission ratio that differs from the direct drive can be implemented and which has the three assembly units comprising an outer gear unit, a planet gear unit and a sun unit, a compact construction and the best possible integration into a final drive unit can be achieved while simultaneously allowing a suitable change in transmission ratio by providing for the propulsion power to be introduced into the transmission via the outer gear unit when propulsion power is being transmitted.

DESCRIPTION

Figure 2:
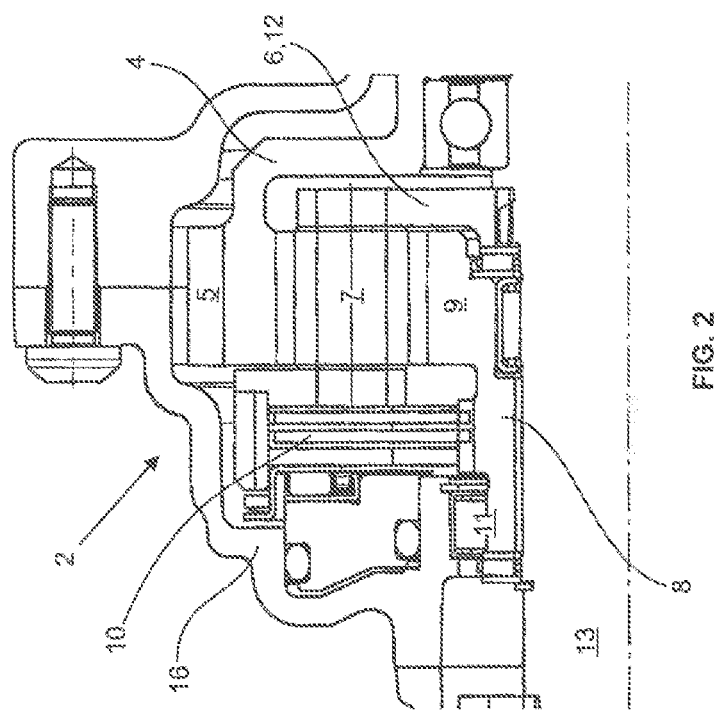
FIG. 2 shows the two-speed transmission from FIG. 1 in an enlarged illustration in accordance with the detail A indicated in FIG. 1.
Figure 1:
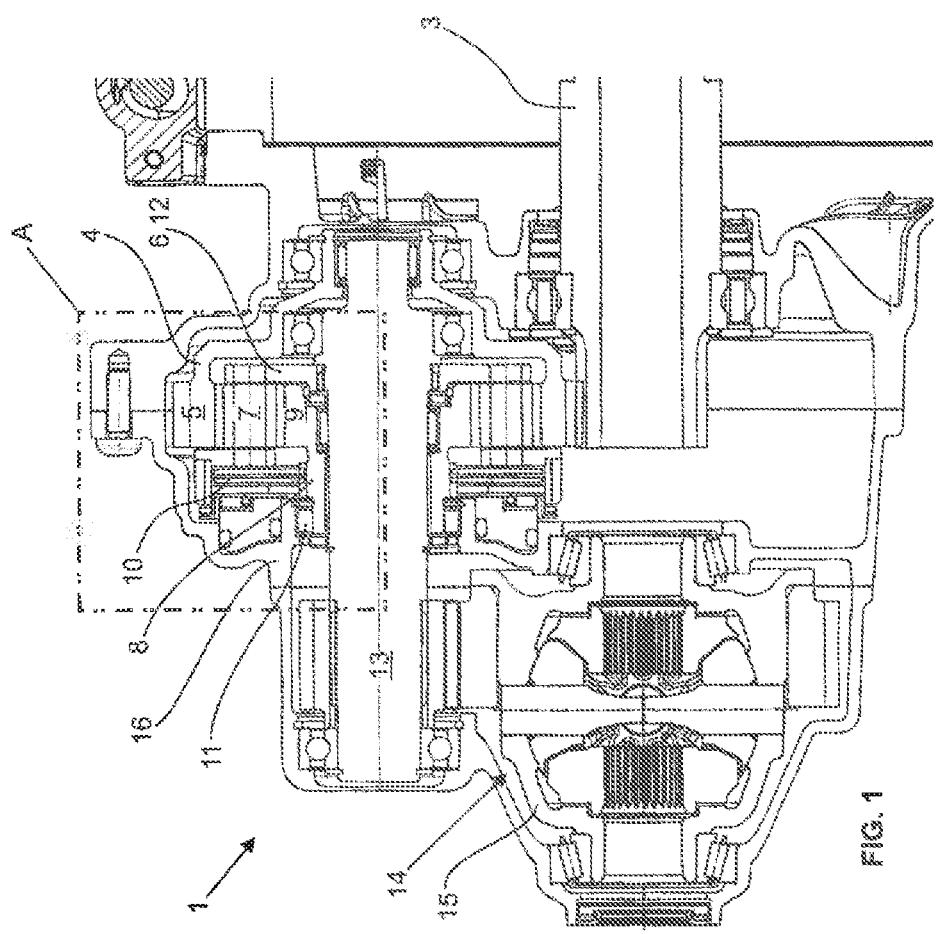
FIG. 1 shows a first example final drive unit having a two-speed transmission, said drive unit possibly being driven by electric motor.

FIG. 1 shows a final drive unit 1 having an integrated two-speed transmission 2. The final drive unit is designed for use in a (hybrid) drivetrain of a motor vehicle, said drivetrain having an electric motor and/or an internal combustion engine. FIG. 2 shows the two-speed transmission indicated by detail A in FIG. 1 in an enlarged illustration.

A transmission input shaft 3 driven by an electric motor, for example, is in direct engagement with an outer gear unit 4 of a two-speed transmission 2 via outer teeth in order to introduce the driving power of the electric motor into the two-speed transmission 2 via the outer gear unit 4. For this purpose, the outer gear unit 4 has an outer gear 5, on the outward-facing lateral surface of which the outer gear teeth in engagement with the driven transmission drive shaft 3 are directly formed. The outer gear 5 thus serves as an input member of the transmission.

Integrated radially into the outer gear 5 is a planet gear unit 6 having a plurality of planet gears 7, which, in turn, mesh with a sun gear 9 of a sun unit 8, said sun gear likewise being integrated axially into the planet gear unit 6. In the example illustrated in FIG. 1, the outer gear 5 is designed as an annulus, i.e. with internal teeth which mesh with the planet gears 7.

Arranged laterally adjacent to the planet gear unit 6 is a hydraulically actuatable clutch 10, by means of which the sun unit 8 and the planet gear unit 6 can be locked relative to one another by closing the clutch 10, thus enabling the two-speed transmission 2 comprising the outer gear unit 4, the planet gear unit 6 and the sun unit 8 to rotate as a block to implement a direct drive (i=1). During this process, the sun gear 9 rotates relative to the final drive housing 16 in a first direction of rotation.

If the clutch 10 is opened to implement a transmission stage having a transmission ratio i≠1, the internal teeth of the outer gear 5 drive the planet gears 7, which, in turn, roll on the sun gear 9, while the sun gear 9 itself remains stationary by virtue of a freewheel 11 acting as a blocking device, which blocks the sun gear 9 in a torque-supporting manner relative to the final drive housing 16 in a second direction of rotation opposite to the first direction of rotation, with the result that the planet gears 7 roll over the sun gear 9 and, while implementing the transmission stage, drive a planet carrier 12 of the planet gear unit 6, which is in positive engagement with a transmission output shaft 13. In the example shown in FIG. 1, the sun gear 9 thus acts as a supporting sun gear, and the planet gear unit 6 with the planet carrier 12 forms the output member of the transmission.

Via the transmission output shaft 13, the differential housing 15 of a differential unit 14 is driven and, via said housing, the driving power is ultimately transmitted to the wheel shafts leading to the driven wheels.

While the examples shown in FIG. 1 and FIG. 2 require a two-speed transmission which has an internally toothed annulus as an outer gear 5 to be able to form the transmission ratio of the transmission stage, an outer gear 5 without internal teeth is used in the examples shown in FIGS. 3 to 6.

The transmission drive shaft 3, which is driven by a drive motor, meshes with an outer gear 5 of an outer gear unit 4 which, just as in the example shown in FIG. 1 and FIG. 2, has outer gear teeth on the outside on its lateral surface. However, in the examples shown in FIGS. 3 to 6, the outer gear unit 4 is connected for conjoint rotation to the planet gear unit 6, thus excluding rotation of the planet gear unit 6 and the outer gear unit 4 relative to one another, irrespective of the shift position of the clutch 10. The outer gear unit 4 and the planet gear unit 6 thus together form a functional unit which acts as an input member of the two-speed transmission.

Figure 4:
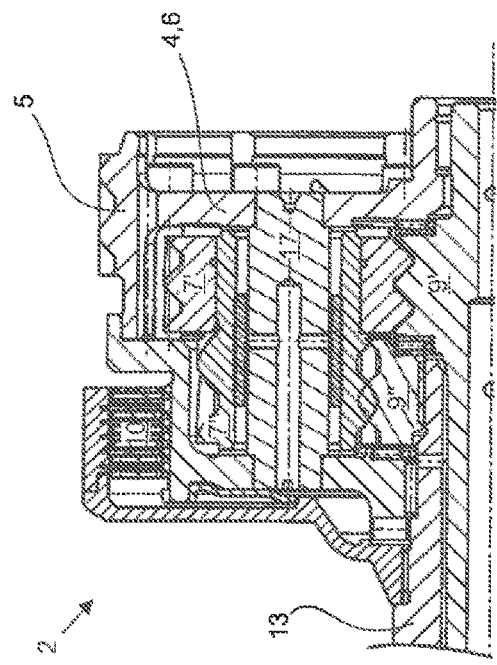
FIG. 4 shows a first variant of a two-speed transmission, which can be used in the final drive unit as an alternative to the example shown in FIG. 3.
Figure 5:
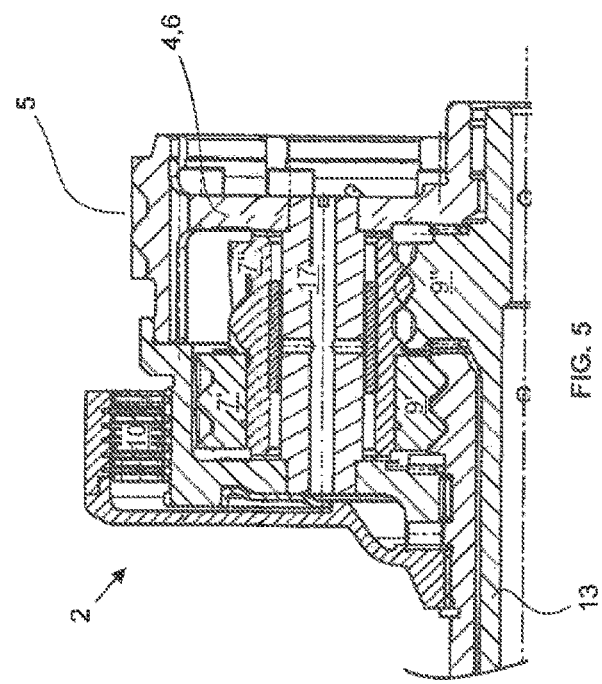
FIG. 5 shows a second variant of a two-speed transmission, which can be used as an alternative to the first variant shown in FIG. 3 and to the example shown in FIG. 4.

The planet gear unit 6 has a plurality of planet gear pairs, which each comprise a first planet gear 7' and a second planet gear 7". The first planet gear 7' and the second planet gear 7" are connected to one another for conjoint rotation and have different effective diameters. To achieve this, the planet gear pair can either be of integral design (FIG. 3) or can be constructed in at least several parts with first planet gears 7' and second planet gears 7" arranged for conjoint rotation with one another, as shown in FIG. 4 and FIG. 5.

If, in the examples shown in FIG. 3 to FIG. 6, the outer gear unit 4 or outer gear 5 are driven in rotation via the transmission drive shaft 3, the outer gear 5 takes along the planet gear shafts 17 on which the planet gear pairs are rotatably mounted. The first planet gear 7' meshes with a supporting sun gear 9', and the second planet gear 7" meshes with an output sun gear 9". The first planet gear and the second planet gear as well as the supporting sun gear 9' and the output sun gear 9" each have different effective diameters.

A clutch 10 is arranged laterally adjacent to the functional unit acting as a transmission input member and including the outer gear unit 4 and the planet gear unit 6. By means of this clutch, the supporting sun gear 9', on the one hand, and the functional unit including the outer gear unit 4 and the planet gear unit 6, on the other hand, can be locked relative to one another, with the result that the transmission as a whole, including the supporting sun gear 9' and the output sun gear 9", revolve as a block in a first direction of rotation and ensures a direct drive (i=1) (closed clutch).

Once the clutch is open, the supporting sun gear 9' is supported via a freewheel 11 against the final drive housing 16 in the manner already described with reference to FIG. 1 and FIG. 2. The first planet gear 7' rolls on the stationary supporting sun gear 9' while it rotates around the planet gear shaft 17 and, in the process, directly drives the second planet gear 7", which, in turn, drives the output sun gear 9", via the teeth acting between the second planet gear 7" and the output sun gear 9" and hence the transmission output shaft 13 connected for conjoint rotation thereto. If they are formed integrally, the output sun gear 9" and the transmission output shaft 13 can jointly form the transmission output member. Of course, it is also possible for the transmission output shaft 13 and the output sun gear 9" to be of multi-part design if the output sun gear 9" is connected for conjoint rotation with the transmission output shaft 13 as a component separate from the latter.

As already explained with reference to FIG. 1, a differential unit 14 having a differential housing 15 is driven via the transmission output shaft 13.

Figure 3:
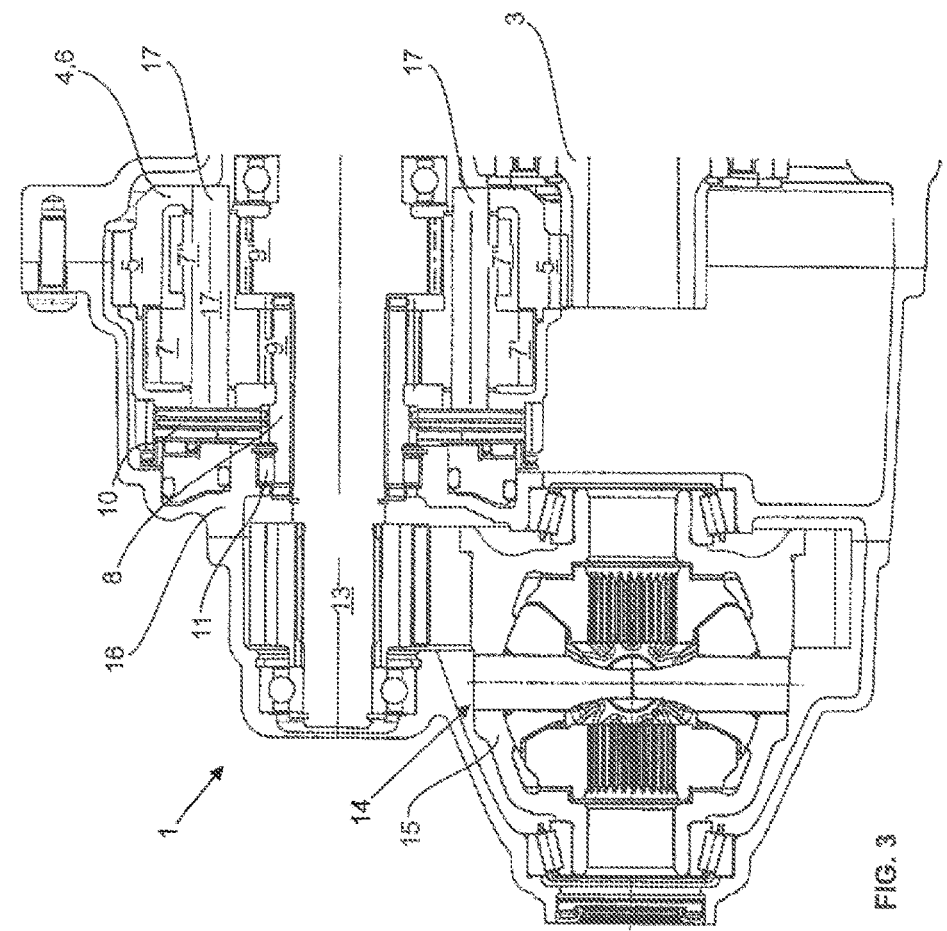
FIG. 3 shows a second example final drive unit having a two-speed transmission, said drive unit possibly being driven by electric motor.
Figure 6:
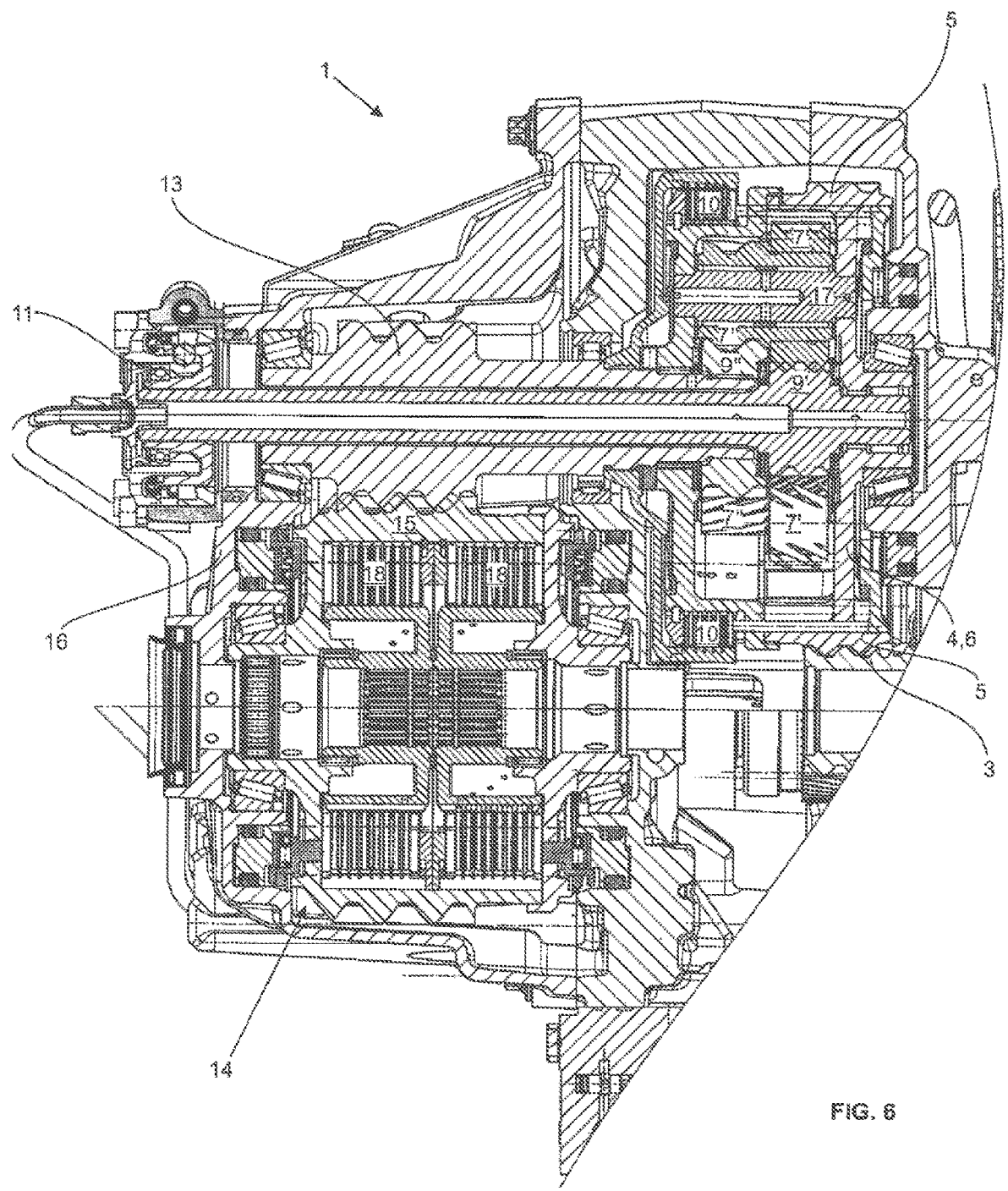
FIG. 6 shows a final drive unit with the variant, shown in FIG. 4, of a two-speed transmission having a clutch-controlled differential unit.

In contrast to FIG. 1 and FIG. 3, FIG. 6 shows a final drive unit 1 in which the differential unit 14 does not have a positively acting differential transmission but has two individually controllable differential clutches 18, by means of which the driving power of an electric motor is transmitted to the driven wheels. In other respects, the two-speed transmission 2 illustrated in FIG. 6 corresponds to the example illustrated in detail in FIG. 4. Common to all the final drive units 1 shown in the Figures is the fact that the transmission drive shaft 3 is embodied as a hollow shaft, the axis of rotation of which coincides with the axis of rotation of the wheel shafts.

In the design that can be seen in FIG. 6, the freewheel 11, which, in the examples in FIG. 1 and FIG. 2, is integrated into the interior of the final drive housing 16, has been shifted toward the outside. To achieve this, an inner shaft is connected to the supporting sun gear 9' and passed outward within the transmission output shaft 13, which is designed as a hollow shaft, in order to interact there in the manner already described above with the blocking device (freewheel 11), which is arranged from the outside on the final drive housing 16 and is therefore easily accessible from the outside.

To implement the desired transmission ratio i>1, the effective diameter of the first planet gear 7' is larger than the effective diameter of the second planet gear 7" and, accordingly, the effective diameter of the supporting sun gear 9' is smaller than the effective diameter of the output sun gear 9". A comparison of FIG. 4 and FIG. 5 illustrates that the first planet gear 7', which meshes with the supporting sun gear 9', can either be arranged on the side of the planet gear pair facing away from the clutch 10, the right-hand side in FIG. 4, or can be arranged on the side of the planet gear pair facing the clutch 10, the left-hand side in FIG. 5. In contrast to the example in FIG. 4 and FIG. 6, the transmission output shaft 13 in FIG. 5 is accordingly designed as an inner shaft, while the shaft interacting with that of a blocking device (freewheel 11) and connected for conjoint rotation to the supporting sun gear 9' is designed as a hollow shaft surrounding the inner shaft.

However, the example shown in FIG. 4 and FIG. 6 is to be preferred because, in this example, the clutch 10 locks the functional unit acting as a transmission input member (outer gear unit 4 and the planet gear unit 6 forming a unit therewith) directly to the transmission output shaft 13, thus ensuring that the other components situated in between (planet gear pair, supporting sun gear, bearings etc.) are effectively bridged and thus to a large extent removed from the drive chain, with the result that they are not subject to any significant stress during the operation of the vehicle in the direct drive mode.

Another advantageous aspect of the example that can be seen in FIG. 4 is that the clutch plates of the clutch 10 can be arranged around the second planet gear 7", the outer lateral surface of which sweeps a smaller diameter than the first planet gear 7". Despite the fact that the clutch 10 surrounds at least some of the planet gear pairs radially on the outside, this enables said clutch to have a smaller diameter than in the example shown in FIG. 5, in which the clutch 10 is arranged around the first planet gear 7'.

LIST OF REFERENCE SIGNS 1 final drive unit
2 two-speed transmission
3 transmission drive shaft
4 outer gear unit
5 outer gear
6 planet gear unit
7 planet gears
8 sun unit
9 sun gear
10 clutch
11 passive freewheel
12 planet carrier
13 transmission output shaft 14 differential unit
15 differential housing
16 final drive housing
17 planet gear shaft
18 differential clutches

The invention claimed is:

1. A final drive unit for a drivetrain of a motor vehicle comprising a two-speed transmission for transmitting propulsion power within the motor vehicle drivetrain, wherein the two-speed transmission comprises:
   a rotationally driven input member, via which, when propulsion power is being transmitted, the propulsion power is introduced into the transmission; and
   an output member, via which the propulsion power can be transmitted out of the transmission;
   wherein, subject to the shift position of a shiftable clutch, a direct drive or a transmission stage having a transmission ratio which differs from the direct drive can be implemented between the input member and the output member,
   wherein three assembly units comprising an outer gear unit, a planet gear unit and a sun unit, are provided, wherein, when propulsion power is being transmitted, the propulsion power is introduced into the transmission via the outer gear unit;
   wherein the planet gear unit has at least one planet gear pair having at least one first planet gear having a first effective planet gear diameter and at least one second planet gear connected for conjoint rotation to the first planet gear and having a second effective planet gear diameter, wherein, in addition to a supporting sun unit having a supporting sun gear having an effective supporting sun gear diameter, an output sun unit having an output sun gear having an output sun gear diameter is provided, and wherein the first planet gear meshes with the supporting sun gear, and the second planet gear meshes with the output sun gear; and
   wherein the supporting sun gear is blocked in at least one direction of rotation by a blocking device, and the propulsion power is transmitted out of the transmission via the output sun gear.

2. The final drive unit of claim 1, wherein the outer gear unit has an outer gear, into which planet gears of the planet gear unit are at least partially integrated and are situated radially on the inside.

3. The final drive unit of claim 1, wherein the outer gear unit has an outer gear having outer teeth, via which the propulsion power is introduced into the outer gear unit.

4. The final drive unit of claim 1, wherein the blocking device is a passive blocking device.

5. The final drive unit of claim 1, wherein the blocking device is a freewheel, which, in one direction of rotation, blocks the assembly unit with which the freewheel interacts and allows it to rotate in the other direction of rotation.

6. The final drive unit of claim 1, wherein the blocking device is an active blocking device to block the assembly unit with which it interacts in at least one direction of rotation.

7. The final drive unit of claim 1, wherein the transmission stage has a transmission ratio greater than 1.

8. The final drive unit of claim 1, wherein the shiftable clutch acts between the outer gear unit and the sun unit.

9. The final drive unit of claim 1, wherein the outer gear unit is not in engagement with planet gears of the planet gear unit.

10. The final drive unit of claim 1, wherein the clutch is arranged to lock the supporting sun unit or the output sun unit to the outer gear unit, and the outer gear unit and the planet gear unit are connected permanently to one another for conjoint rotation to form a functional unit in order to jointly form the input member.

11. The final drive unit of claim 1, wherein the final drive unit has a differential unit for driving wheel shafts, and the two-speed transmission and the differential unit are arranged in a common final drive housing.

12. The final drive unit of claim 1, wherein a motor-driven transmission drive shaft is in direct power-transmitting engagement with the outer gear unit in order to introduce the driving power of the motor into the two-speed transmission.

13. The final drive unit of claim 12, wherein the motor-driven transmission drive shaft is arranged coaxially with a wheel shaft.

14. The final drive unit of claim 1, wherein the output member of the transmission is in direct power-transmitting engagement with a differential housing of a differential unit.

15. The final drive unit of claim 1, wherein the final drive unit has a differential unit, which is clutch-controlled by means of at least one differential clutch, the differential unit has a differential housing, and the differential housing is a clutch plate carrier of the at least one differential clutch.

* * * * *